United States Patent
Shaffer et al.

(10) Patent No.: US 7,002,992 B1
(45) Date of Patent: Feb. 21, 2006

(54) CODEC SELECTION TO IMPROVE MEDIA COMMUNICATION

(75) Inventors: Shmuel Shaffer, Palo Alto, CA (US); Michael E. Knappe, Sunnyvale, CA (US); Joseph F. Khouri, San Jose, CA (US); Robert T. Bell, Bountiful, UT (US); Robert E. Gleichauf, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 09/802,098

(22) Filed: Mar. 7, 2001

(51) Int. Cl.
*H04J 3/16* (2006.01)

(52) U.S. Cl. .................................... 370/468; 370/252

(58) Field of Classification Search .............. 370/252, 370/253, 352, 353, 354, 355, 356, 389, 392, 370/394, 468

See application file for complete search history.

(56) References Cited

U.S. PATENT DOCUMENTS

| | | | |
|---|---|---|---|
| 6,026,082 A | 2/2000 | Astrin | |
| 6,108,560 A | 8/2000 | Navaro et al. | |
| 6,356,545 B1 * | 3/2002 | Vargo et al. | 370/355 |
| 6,445,697 B1 | 9/2002 | Fenton | |
| 6,512,924 B1 * | 1/2003 | Sawada et al. | 455/435.1 |
| 6,597,702 B1 | 7/2003 | Caugherty | |
| 6,600,738 B1 | 7/2003 | Alperovich et al. | |
| 6,633,582 B1 | 10/2003 | Panburana et al. | |
| 6,731,734 B1 | 5/2004 | Shaffer et al. | |
| 6,751,477 B1 * | 6/2004 | Alperovich et al. | 455/560 |
| 6,754,221 B1 * | 6/2004 | Whitcher et al. | 370/401 |
| 6,754,232 B1 | 6/2004 | Tasker | |
| 6,757,277 B1 * | 6/2004 | Shaffer et al. | 370/356 |
| 6,785,263 B1 | 8/2004 | Morinaga et al. | |
| 6,798,786 B1 * | 9/2004 | Lo et al. | 370/468 |
| 6,826,174 B1 | 11/2004 | Erekson et al. | |

\* cited by examiner

*Primary Examiner*—Bob A. Phunkulh
(74) *Attorney, Agent, or Firm*—Baker Botts L.L.P.

(57) ABSTRACT

A communication system includes an endpoint that performs codec selection based on at least one network parameter. In a particular embodiment, a communication session exchanges voice information, and the codec selection improves the overall voice quality of the communication session.

40 Claims, 3 Drawing Sheets

CODEC SELECTION TO IMPROVE MEDIA COMMUNICATION

TECHNICAL FIELD OF THE INVENTION

This invention relates generally to the field of communication, and more particularly to codec selection to improve media communication.

BACKGROUND OF THE INVENTION

Traditional circuit-switched communication networks have provided a variety of voice services to end users for many years. A recent trend delivers these voice services using networks that communicate voice information in packets. A communication session in a packet network typically includes two endpoints that together exchange packets of voice information using a compression/decompression (codec) standard supported by each endpoint.

Current voice over packet (VoP) systems utilize static codec selection. If the architecture is based on a central configuration server, this server determines the codec to be used for each call. In a distributed system, the endpoints select a codec that both sides can support and establish a communication session utilizing that codec.

SUMMARY OF THE INVENTION

The present invention solves many of the problems and disadvantages associated with prior communications systems. In a particular embodiment, the present invention provides codec selection based on network performance.

In a particular embodiment, a method for selecting one of a number of codecs for a communication session includes receiving assessment packets and determining at least one network parameter based on the assessment packets. The method selects one of a number of codecs using at least one network parameter and communicates media using the selected codec.

In another embodiment, an apparatus for selecting one of a number of codecs for a communication session includes a number of codecs and a network interface that receives assessment packets. A processor coupled to the codecs and the network interface determines at least one network parameter based on the assessment packets and selects one of the codecs using the at least one network parameter.

Technical advantages of certain embodiments of the present invention include the ability to select a codec for a communication session in response to network performance indicated by at least one network parameter. In a particular embodiment, an endpoint receives assessments packets, determines at least one network parameter, and selects a codec that optimizes voice quality based on the network parameter. Network parameters may include jitter, delay, packet fragmentation, packet loss, or other measure that indicates the performance of the network. The endpoint may support a number of codecs that can offer varying levels of performance based on the network parameter. The codec selection technique may occur at the initiation of a communication session or dynamically during the communication session as network performance changes. Moreover, the endpoint may perform a variety of bandwidth reservation techniques responsive to the bandwidth requirements of the codecs. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
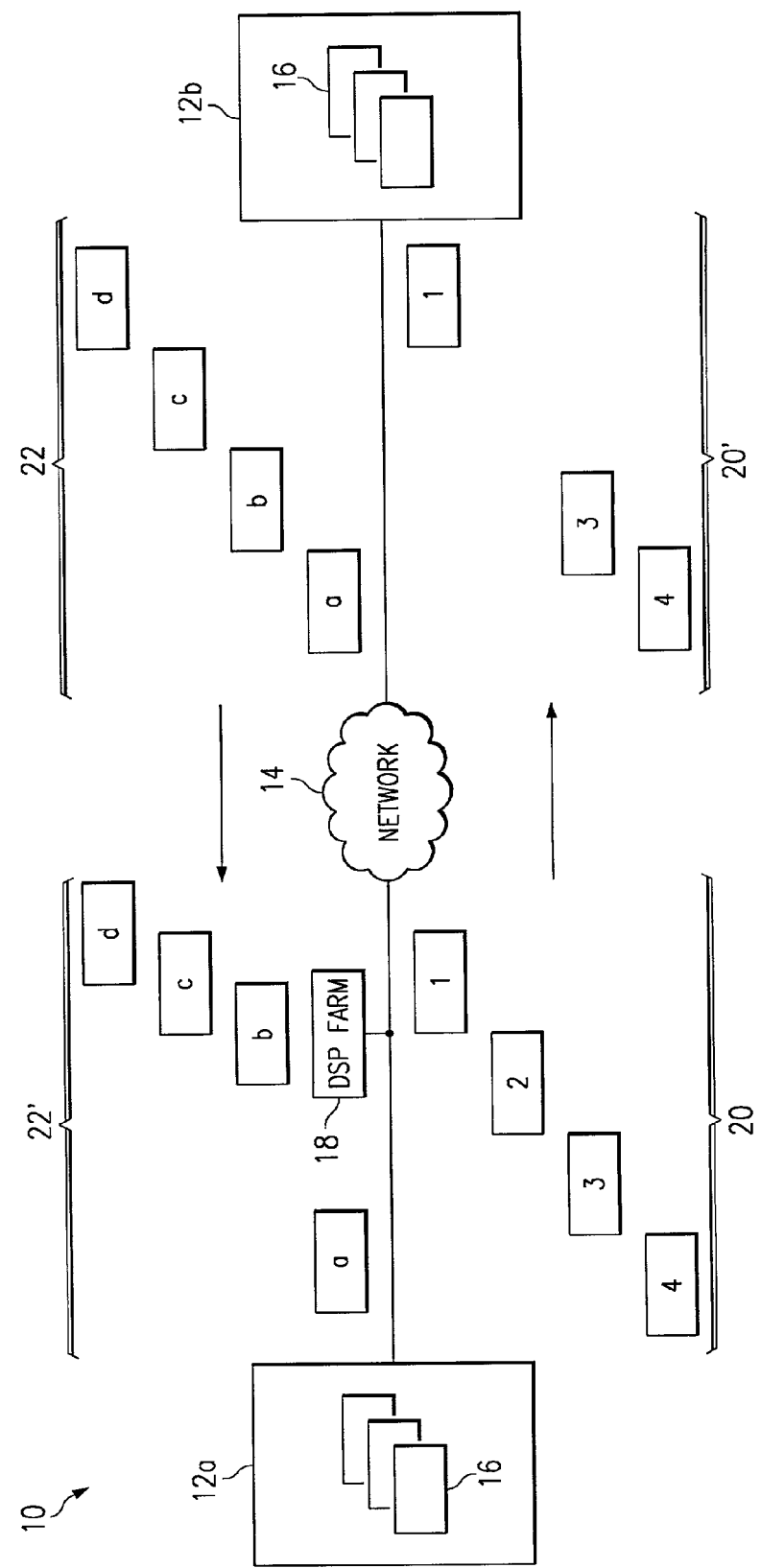
FIG. 1 illustrates one embodiment of a communication system incorporating teachings of the present invention.

FIG. 1 illustrates a communication system 10 that includes endpoints 12a and 12b (generally referred to as endpoints 12), that establish a communication session using network 14. Each endpoint 12 maintains a plurality of compression/decompression modules (codecs) 16 that compress, decompress, and otherwise process voice, video, data, and other information (generally referred to as media) exchanged between endpoints 12. At the initiation of a communication session or during the session, endpoint 12 may select an appropriate codec based on the performance of network 14.

Endpoints 12 may be any combination of hardware and/or software that provide communication services to a user. For example, endpoint 12 may be a telephone, a computer running telephony software, a video monitor, a camera, or any other communication or processing hardware and/or software that supports the communication of packets of media using network 14. Endpoints 12 may also include unattended or automated systems, gateways, other intermediate components, or other devices that can establish media sessions. Although FIG. 1 illustrates two endpoints 12, communication system 10 contemplates any number and arrangement of endpoints 12 for communicating media. For example, the described technologies and techniques for establishing a communication session between endpoints 12 may be adapted to establish a conference between more than two endpoints 12.

Each endpoint 12, depending on its configuration, processing capabilities, and other factors, supports certain communication protocols. For example, endpoints 12 each include codecs 16 that support the compression, decompression, and/or processing of media communicated by endpoint 12. Each codec 16 may be any selection of software, hardware, and/or firmware that implements media processing capabilities. In a particular embodiment, codecs 16 support voice compression/decompression by implementing a voice model or algorithm in a set of equations. Examples of codec standards supported by endpoints 12 may include G.711, G.723, G.729, and any other technique or collection of equation(s) that processes voice information for communication using network 14. Each codec 16 may exhibit different characteristics depending on the performance of network 14, and these characteristics may impact the overall quality of media received at endpoints 12. One particular advantage of endpoints 12 is their ability to select a particular codec 16 suitable for maximizing or enhancing the media quality of a communication session given the current network environment.

The function of codecs 16 may be performed locally at endpoints 12 or using a remote resource. For example, a digital signal processor (DSP) farm 18 may couple directly or indirectly to endpoints 12 or network 14 to provide further codec functionality. DSP farm 18 includes any suitable arrangement of hardware and/or software that implements a variety of codecs 16 to compress, decompress, or otherwise process media exchanged between endpoints 12. Remoting codecs 16 to DSP farm 18 allows efficient sharing of resources in system 10, and provides a more scalable and flexible delivery of codec capability to endpoints 12 at various locations in system 10. In this embodiment, endpoints 12 can consider the resources and codecs 16 supported by an accessible DSP farm 18 in selecting an appropriate codec. Although FIG. 1 depicts a single DSP farm 18, system 10 contemplates any number and arrangement of DSP farms 18.

Network 14 may be a local area network (LAN), wide area network (WAN), global distributed network such as the Internet, intranet, extranet, or any other form of wireless or wireline communication network. Generally, network 14 provides for the communication of packets, cells, frames, or other portion of information (generally referred to as packets) between endpoints 12. Network 14 may include any combination of routers, hubs, switches, and other hardware and/or software implementing any number of communication protocols that allow for the exchange of packets in communication system 10. In a particular embodiment, network 14 employs communication protocols that allow for the addressing or identification of endpoints 12 coupled to network 14. For example, using Internet protocol (IP), each of the components coupled together by network 14 in communication system 10 may be identified in information directed using IP addresses. In this manner, network 14 may support any form and combination of point-to-point, multicast, unicast, or other techniques for exchanging media packets among components in system 10. Due to congestion, component failure, or other circumstance, network 14 may experience performance degradation in exchanging packets between endpoints 12. One or more network parameters determined by endpoints 12 reflects the performance of network 14. These network parameters may include delay, jitter, packet fragmentation, packet loss, or any other measure that indicates or reflects the performance of network 14. In a particular embodiment, network parameters assessed and used by endpoints 12 to select codecs 16 relate to the voice quality experienced by a user in a voice communication session.

In operation, endpoints 12a and 12b desire to establish a communication session to exchange media. To initiate the session, endpoint 12a communicates first assessment packets 20 to endpoint 12b. Due to the performance of network 14, first assessment packets 20' received by endpoint 12b do not include packet 2 and show a delay in the reception of packet 3. Endpoint 12b determines one or more network parameters, such as packet loss and delay, based on the receipt of first assessment packets 20'.

Concurrently or in sequence, endpoint 12b communicates second assessment packets 22 to endpoint 12a using network 14. Endpoint 12a receives second assessment packets 22' that indicate a delay for both packets b and c. Endpoint 12a can then determine one or more network parameters in response to second assessment packets 22'. Although system 10 shows a bi-directional assessment of network performance, system 10 contemplates unidirectional, bi-directional, or multi-directional network performance assessment in any arrangement or hierarchy of endpoints 12, including peer-to-peer and master/slave arrangements.

Assessment packets 20 and 22 (referred to generally as assessment packets 20) may include any form of packet that allows endpoints 12 to determine at least one network parameter. In one embodiment, assessment packets 20 include real-time transfer control protocol (RTCP) packets that may or may not contain media. Both RTCP payload packets containing media or RTCP test packets with no media contain timestamps and sequence numbers that allow endpoints 12 to determine delay and packet loss. Assessment packets 20 may include actual voice packets exchanged between endpoints 12 engaged in a communication session. System 10 contemplates any other form of assessment packets 20 that allows endpoints 12 to assess performance of network 14. Endpoint 12 may provide a default codec 16 that initially generates assessment packets for communication over network 14. In another embodiment, endpoint 12 generates assessment packets 20 without the use of a codec.

Upon endpoints 12a and/or 12b determining one or more network parameters based on assessment packets 201 and/or 22', endpoints 12 may then negotiate the selection of an appropriate codec 16 supported by endpoints 12 and selected to provide the best media quality given the current performance of network 14. Endpoints 12 then exchange media using the selected codec. In a particular embodiment, endpoints 12 continue to monitor the performance of network 14 and may select different codecs 16 as network performance changes.

Figure 2:
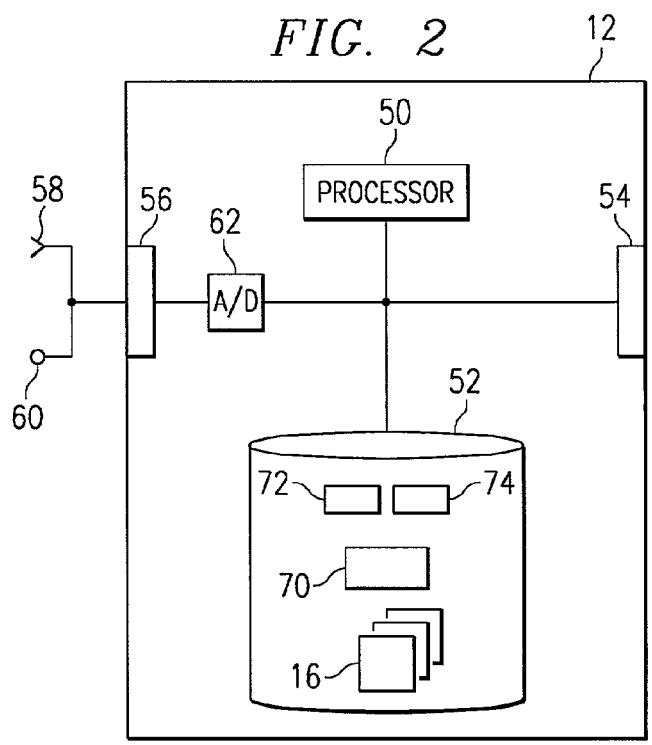
FIG. 2 illustrates an endpoint in the communication system.

FIG. 2 illustrates endpoint 12 in communication system 10. Endpoint 12 includes a processor 50, a memory 52, and a network interface 54. Processor 50 may be a microprocessor, controller, digital signal processor (DSP), or any other suitable computing device or resource. Memory 52 may be any form of volatile or nonvolatile memory, including but not limited to magnetic media, optical media, random access memory (RAM), read only memory (ROM), removable media, or any other suitable local or remote memory component. Endpoint 12 also includes a user interface 56 that allows presentation of media to a user of endpoint 12. In a particular embodiment, user interface 56 exchanges media between a speaker 58, a microphone 60, and an analog-to-digital converter (A/D) 62.

Memory 52 is shown to contain a number of codecs 16. In a particular embodiment, codec 16 may include software and/or firmware maintained by some component of memory 52. However, endpoint 12 contemplates codecs 16 being any combination of hardware and/or software. For example, codec 16 may be implemented in dedicated hardware, such as an application specific integrated circuit (ASIC), DSP, or other component running appropriate firmware. Memory 52 also contains a program 70, network parameter 72, and codec selection data 74. Program 70 may be accessed by processor 50 to manage the overall operation and function of endpoint 12. Network parameter 72 includes at least one network parameter determined by endpoint 12 such as delay, jitter, packet loss, or any other suitable parameter, that reflects or indicates the performance of network 14. Codec selection data 74, described in more detail below with reference to FIG. 3, allows endpoint 12 to select an appropriate codec 16 based on network parameter 72.

In operation, endpoint 12, either based on user initiation or upon receiving an indication from network interface 54, initiates a communication session. Endpoint 12 receives assessments packets 20 communicated from a remote location at network interface 54. In a bi-directional network performance assessment, endpoint 12 may also communicate assessment packets 20 to the remote location using network interface 54.

Upon receiving assessment packets 20, processor 50 determines at least one network parameter 72. Processor 50 then uses network parameter 72 and codec selection data 74 to determine an appropriate codec 16 for the communication session. Processor 50 then initiates communication of media using the selected coded 16. In a particular embodiment of a voice communication session, outbound voice information originates at microphone 60 for communication to A/D 62 via user interface 56. Selected codec 16 then processes the digitized voice information for communication using network interface 54. For inbound voice information, selected codec 16 receives packets of voice information from network interface 54, processes these packets, and passes the digitized voice information to A/D 62. User interface 56 communicates this information to speaker 58 for presentation to the user of endpoint 12.

System 10 supports either symmetric or non-symmetric codec selection. For symmetric codec selection, endpoints 12 select the same codec 16 for bidirectional communication. For non-symmetric codec selection, communication from endpoint 12a to endpoint 12b uses a first codec 16, whereas communication from endpoint 12b to endpoint 12a uses a second codec 16 different from the first codec 16. In this manner, the codec selection process occurring at each endpoint 12 may be independent.

Figure 3:
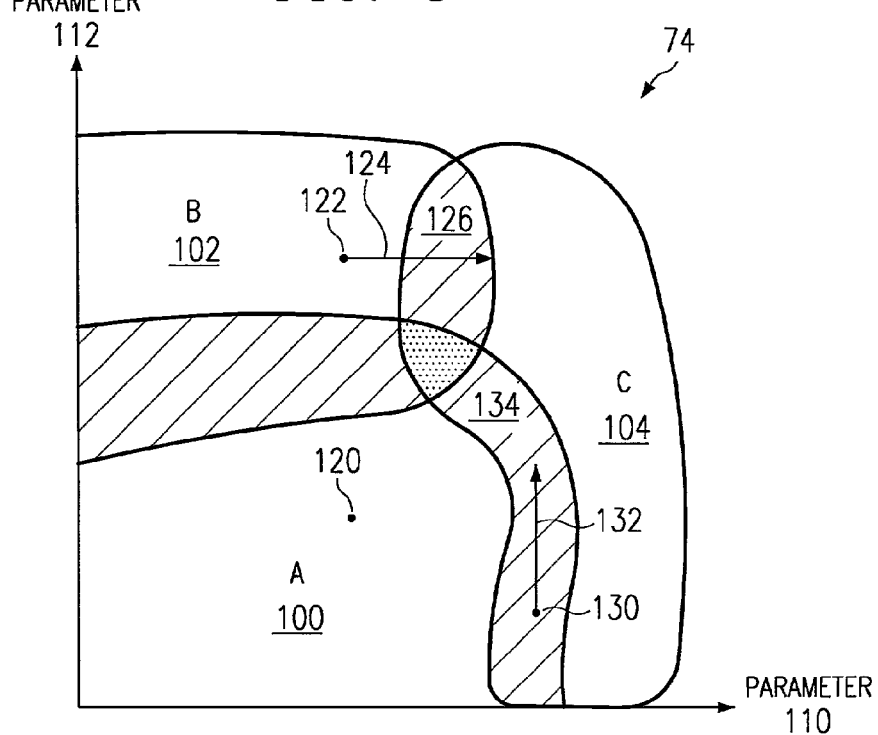
FIG. 3 is an illustrative mapping of network parameters to selected codecs.

FIG. 3 is a representation of codec selection data 74 maintained by endpoint 12. In a particular embodiment, subjective and/or objective analysis may be performed to determine the optimal selection of codecs 16 based on one or more network parameters 72. Endpoint 12 may store codec selection data 74 prior to initiation of a communication session. Endpoint 12 may update codec selection data 74 based on the availability of additional codecs 16, subjective user assessments of voice quality and other parameters, and objective assessments performed by endpoint 12.

Endpoint 12 stores codec selection data 74 in any suitable table, array, database, or other representation that allows selection of codecs 16 based on network parameter 72. In the illustrative embodiment, codec selection data 74 defines different regions 100, 102, and 104 that each correspond to a codec 16 supported by endpoint 12. Regions in this example occupy two-dimensional space defined by values for two network parameters 110 and 112. Given a determined value for network parameters 110 and 112, codec selection data 74 specifies at least one codec 16 suitable for the determined performance of network 14 as indicated by parameters 110 and 112. Although codec selection data 74 is shown illustratively as two-dimensional, endpoint 12 contemplates any arrangement of information that allows selection of codecs 16 based on at least one network parameter 72.

Assume endpoint 12 determines network parameters 110 and 112 to define a point 120 in the two-dimensional space of codec selection data 74. Since point 120 lies exclusively within region 100, endpoint 12 selects codec A for use in the communication session. Next, assume upon the initiation of communication session, endpoint 12 determines network parameters 110 and 112 to define point 122 in region 102. Accordingly, endpoint 12 selects codec B to initiate the communication session. During the session, parameter 110 changes its value as indicated by arrow 124. To prevent continuous changes in codecs 16 during a communication session, endpoint 12 continues to use codec B within overlapping region 126. If parameter 110 continues to change and move beyond the boundary of region 126 into the exclusive area of region 104, then endpoint 12 may switch to codec C for the communication session. Now assume the initial determination of network parameters 110 and 112 defines a point 130 in codec selection data 74. In this example, endpoint 12 may select either codec A (region 100) or codec C (region 104). As network parameters 110 and 112 change, as indicated by arrow 132, endpoint 12 may select a different codec 16 after point 130 emerges from overlapping region 134. Endpoint 12 contemplates any suitable technique or function to make and change codec selections using regions defined by codec selection data 74.

Figure 4:
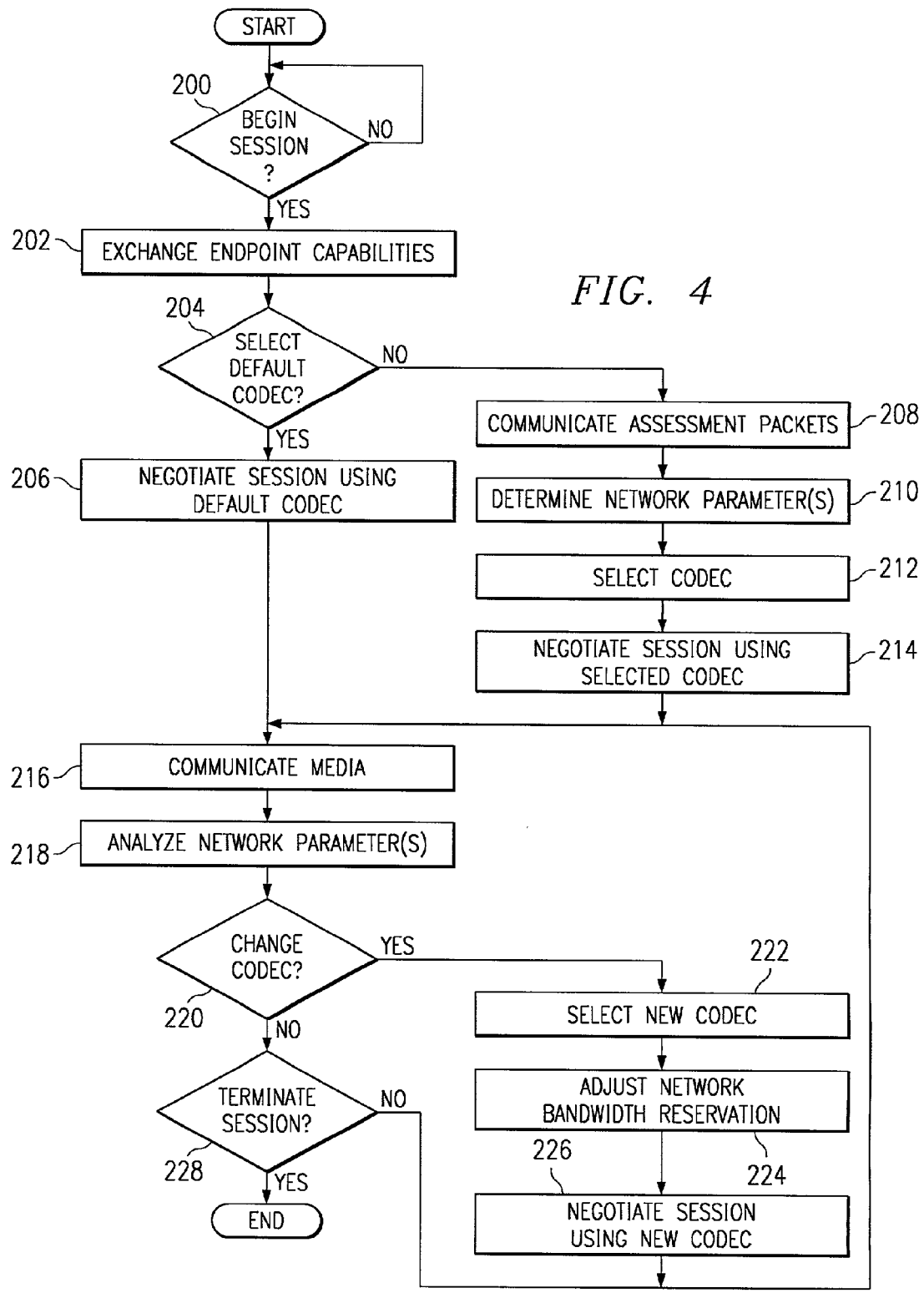
FIG. 4 is a flowchart of a method performed by an endpoint to select a codec for a communication session.

FIG. 4 illustrates a flowchart of a method for codec selection performed by endpoint 12. The method begins at step 200 where endpoint 12 determines whether to begin a communication session. Endpoint 12 may initiate a communication session itself, or in response to a call request received at network interface 54 from a remote location, such as another endpoint 12. Upon determining that a communication session should be initiated, endpoint 12 exchanges capabilities with the remote location at step 202. These endpoint capabilities may include codecs 16 supported by endpoints 12, network parameter 74 determined by endpoints 12, or other information suitable for supporting the codec selection process of endpoint 12. Endpoint 12 then determines whether to select a default codec 16 at step 204. If endpoint 12 selects the default codec 16 at step 204, then endpoint 12 negotiates a communication session using the default codec 16 at step 206.

If endpoint 12 does not select a default codec 16 at step 204, then endpoint 12 communicates assessment packets 20 with the remote location at step 208. At this step, endpoint 12 receives assessment packets 20 from the remote location and, in a particular embodiment, may also communicate assessment packets 20 to allow the remote location to perform its own codec selection process. Assessments packets 20 may be RTCP packets that include both a timestamp and sequence number to assess network performance. Using assessment packets, endpoint 12 determines at least one network parameter 74 at step 210. Using network parameter 72 and codec selection data 74, endpoint 12 selects a suitable codec 16 at step 212, and negotiates the communication session using the selected codec 16 at step 214.

Endpoint 12 communicates media at step 216 using either the default or selected codec 16. In a non-symmetrical operation, endpoint 12 may communicate media using a first codec 16, but receive media from the remote location using a second codec 16 different from the first codec 16. By selecting codec 16 in response to network parameter 72, endpoint 12 optimizes or enhances the quality of media received at endpoint 12. In a particular embodiment, endpoint 12 continues to monitor the performance of network 14 at step 218 using, for example, assessment packets 20 in the form of voice packets exchanged between endpoints 12 during the communication session. If, upon analyzing changes in network parameter 72 with codec selection data 74, endpoint 12 determines to change codec 16 at step 220, endpoint 12 selects the new codec 16 at step 222 and may adjust network bandwidth reservation based on the bandwidth requirements of the selected codec 16 at step 224. If network 14 cannot satisfy a requested bandwidth reservation made by endpoint 12 at step 224, then endpoint 12 may attempt to select a new codec 222 based on the bandwidth limitations currently experienced by network 14.

Endpoint 12 may implement a number of techniques to manage bandwidth reservation. For example, when the new codec requires less bandwidth than the codec that is in use, endpoint 12 may yield excess bandwidth or just keep any excess bandwidth to facilitate a potential switch back to the original codec. When the new codec requires greater bandwidth than the codec that is in use, endpoint 12 may attempt to secure the additional bandwidth before switching to the new codec. If endpoint 12 cannot secure the additional bandwidth, the transition to the new codec may be delayed or cancelled. If the additional bandwidth is not available, endpoint 12 may also assess the performance of the new codec without a reserved bandwidth. In this manner, endpoint 12 can compare network parameter 72 between two streams, one using the original codec with sufficient bandwidth reserved and the other using the new codec with insufficient bandwidth reserved. In yet another embodiment, during the call setup, endpoint 12 reserves sufficient bandwidth for the least bandwidth efficient codec for the duration of the call, and does not yield any excess bandwidth when it switches to a lower bandwidth codec.

After satisfying any bandwidth reservation requirements, endpoint 12 negotiates the communication session using the new codec 16 at step 226 and continues to communicate media at step 216. This process may continue as endpoint 12 continuously adapts to changing network performance to select the best codec 16 to improve or sustain media quality. Endpoint 12 also determines whether a communication session terminates at step 228. If the communication session does not terminate, endpoint 12 continues to communicate media at step 216, otherwise the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus for selecting one of a plurality of codecs for a communication session, comprising:
    a network interface operable to receive a plurality of assessment packets;
    a plurality of codecs; and
    a processor coupled to the network interface and the codecs, the processor operable to determine at least one network parameter based on the assessment packets, the processor further operable to select one of a plurality of codecs using the at least one network parameter, the processor further operable to request additional bandwidth if the selected codec requires more bandwidth, and the processor further operable to release excess bandwidth if the selected codec requires less bandwidth.

2. The apparatus of claim 1, wherein the assessment packets comprise a plurality of real-time transfer control protocol (RTCP) packets without media.

3. The apparatus of claim 1, wherein the at least one network parameter comprises packet loss and delay.

4. The apparatus of claim 1, wherein the processor is further operable to:
    monitor the at least one network parameter; and
    select a Previously Presented codec from the plurality of codecs in response to a change in the at least one network parameter.

5. The apparatus of claim 1, wherein the selected codec requires less bandwidth, and the apparatus retains excess reserved bandwidth to facilitate a potential switch to a codec requesting more bandwidth than the selected codec.

6. The apparatus of claim 1, wherein the selected codec requires more bandwidth which is unavailable, and the processor is operable to:
    store the at least one network parameter as a first network parameter;
    determine at least one second network parameter based on a plurality of second assessment packets received using the selected codec; and
    compare the first network parameter to the second network parameter to determine whether to switch to the selected codec.

7. The apparatus of claim 1, wherein the processor is further operable to:
    reserve, at the initiation of the communication session, a sufficient bandwidth for the least bandwidth efficient codec supported by the endpoint; and
    maintain the reservation of the sufficient bandwidth when the selected codec requires less than the sufficient bandwidth.

8. The apparatus of claim 1, wherein:
    the media comprises voice information; and
    the at least one network parameter comprises a network parameter that impacts voice quality experienced by a user participating in the communication session.

9. The apparatus of claim 1, wherein the codecs implement at least a selected one of a G.711, G.723, and G.729 voice compression standard.

10. The apparatus of claim 1, further comprising a memory operable to store codec selection data that associates the at least one network parameter to a corresponding codec, wherein the processor is operable to select the corresponding codec using the stored codec selection data.

11. Logic encoded in media for selecting one of a plurality of codecs for a communication session, the logic operable to perform the following steps:
    receiving a plurality of assessment packets;
    determining at least one network parameter based on the assessment packets;
    selecting one of a plurality of codecs using the at least one network parameter;
    requesting additional bandwidth if the selected codec requires more bandwidth;
    releasing excess bandwidth if the selected codec requires less bandwidth; and
    communicating media using the selected codec.

12. The logic encoded in media of claim 11, wherein the assessment packets comprise a plurality of real-time transfer control protocol (RTCP) packets without media.

13. The logic encoded in media of claim 11, wherein the at least one network parameter comprises packet loss and delay.

14. The logic encoded in media of claim 11, further comprising:
    monitoring the at least one network parameter; and
    selecting a Previously Presented codec from the plurality of codecs in response to a change in the at least one network parameter.

15. The logic encoded in media of claim 11, wherein the selected codec requires less bandwidth, and further comprising retaining excess reserved bandwidth to facilitate a potential switch to a codec requesting more bandwidth than the selected codec.

16. The logic encoded in media of claim 11, wherein the selected codec requires more bandwidth which is unavailable, and further comprising:
    storing the at least one network parameter as a first network parameter;

receiving a plurality of second assessment packets using the selected codec;
determining at least one second network parameter based on the assessment packets; and
comparing the first network parameter to the second network parameter to determine whether to switch to the selected codec.

17. The logic encoded in media of claim 11, further comprising:
reserving, at the initiation of the communication session, a sufficient bandwidth for the least bandwidth efficient codec supported by the endpoint; and
maintaining the reservation of the sufficient bandwidth when the selected codec requires less than the sufficient bandwidth.

18. The logic encoded in media of claim 11, further comprising:
communicating a plurality of additional assessment packets to a remote endpoint; and
wherein the step of selecting comprises negotiating with the remote endpoint to select a codec.

19. The logic encoded in media of claim 11, wherein:
the media comprises voice information; and
the at least one network parameter comprises a network parameter that impacts voice quality experienced by a user participating in the communication session.

20. The logic encoded in media of claim 11, wherein the codecs implement at least a selected one of a G.711, G.723, and G.729 voice compression standard.

21. The logic encoded in media of claim 11, wherein selecting one of a plurality of codecs comprises:
retrieving pre-stored codec selection data that associates the at least one network parameter to a corresponding codec; and
selecting the corresponding codec using the pre-stored codec selection data.

22. An apparatus for selecting one of a plurality of codecs for a communication session, the apparatus comprising:
means for receiving a plurality of assessment packets;
means for determining at least one network parameter based on the assessment packets;
means for selecting one of a plurality of codecs using the at least one network parameter;
means for requesting additional bandwidth if the selected codec requires more bandwidth;
means for releasing excess bandwidth if the selected codec requires less bandwidth; and
means for communicating media using the selected codec.

23. The apparatus of claim 22, wherein the assessment packets comprise a plurality of real-time transfer control protocol (RTCP) packets without media.

24. The apparatus of claim 22, wherein the at least one network parameter comprises packet loss and delay.

25. The apparatus of claim 22, wherein:
the media comprises voice information; and
the at least one network parameter comprises a network parameter that impacts voice quality experienced by a user participating in the communication session.

26. A method for selecting one of a plurality of codecs for a communication session, the method comprising the following steps performed by an endpoint participating in the communication session:
receiving a plurality of assessment packets;
determining at least one network parameter based on the assessment packets;
selecting one of a plurality of codecs using the at least one network parameter;
requesting additional bandwidth if the selected codec requires more bandwidth;
releasing excess bandwidth if the selected codec requires less bandwidth; and
communicating media using the selected codec.

27. The method of claim 26, wherein the assessment packets comprise a plurality of real-time transfer control protocol (RTCP) packets without media.

28. The method of claim 26, wherein the at least one network parameter comprises packet loss and delay.

29. The method of claim 26, further comprising:
monitoring the at least one network parameter; and
selecting a Previously Presented codec from the plurality of codecs in response to a change in the at least one network parameter.

30. The method of claim 26, wherein the selected codec requires less bandwidth, and further comprising retaining excess reserved bandwidth to facilitate a potential switch to a codec requesting more bandwidth than the selected codec.

31. The method of claim 26, wherein the selected codec requires more bandwidth which is unavailable, and further comprising:
storing the at least one network parameter as a first network parameter;
receiving a plurality of second assessment packets using the selected codec;
determining at least one second network parameter based on the assessment packets; and
comparing the first network parameter to the second network parameter to determine whether to switch to the selected codec.

32. The method of claim 26, further comprising:
reserving, at the initiation of the communication session, a sufficient bandwidth for the least bandwidth efficient codec supported by the endpoint; and
maintaining the reservation of the sufficient bandwidth when the selected codec requires less than the sufficient bandwidth.

33. The method of claim 26, further comprising:
communicating a plurality of additional assessment packets to a remote endpoint; and
wherein the step of selecting comprises negotiating with the remote endpoint to select a codec.

34. The method of claim 26, wherein:
the media comprises voice information; and
the at least one network parameter comprises a network parameter that impacts voice quality experienced by a user participating in the communication session.

35. The method of claim 26, wherein the codecs implement at least a selected one of a G.711, G.723, and G.729 voice compression standard.

36. The method of claim 26, wherein selecting one of a plurality of codecs comprises:
retrieving pre-stored codec selection data that associates the at least one network parameter to a corresponding codec; and
selecting the corresponding codec using the pre-stored codec selection data.

37. A method for selecting one of a plurality of codecs for a communication session, the method comprising the following steps performed by an endpoint participating in the communication session:
receiving a plurality of assessment packets;
determining at least one network parameter based on the assessment packets;

selecting one of a plurality of codecs using the at least one network parameter, wherein the selected codec requires less bandwidth;

retaining excess reserved bandwidth to facilitate a potential switch to a codec requesting more bandwidth than the selected code; and communicating media using the selected codec.

38. A method for selecting one of a plurality of codecs for a communication session, the method comprising the following steps performed by an endpoint participating in the communication session:

receiving a plurality of assessment packets;

determining at least one network parameter based on the assessment packets;

selecting one of a plurality of codecs using the at least one network parameter, wherein the selected codec requires more bandwidth which is unavailable;

storing the at least one network parameter as a first network parameter;

receiving a plurality of second assessment packets using the selected codec;

determining at least one second network parameter based on the assessment packets;

comparing the first network parameter to the second network parameter to determine whether to switch to the selected codec; and communicating media using the selected codec.

39. A method for selecting one of a plurality of codecs for a communication session, the method comprising the following steps performed by an endpoint participating in the communication session:

receiving a plurality of assessment packets;

determining at least one network parameter based on the assessment packets;

selecting one of a plurality of codecs using the at least one network parameter;

reserving, at the initiation of the communication session, a sufficient bandwidth for the least bandwidth efficient codec supported by the endpoint;

maintaining the reservation of the sufficient bandwidth when the selected codec requires less than the sufficient bandwidth; and communicating media using the selected codec.

40. A method for selecting one of a plurality of codecs for a communication session, the method comprising the following steps performed by an endpoint participating in the communication session:

receiving a plurality of assessment packets;

determining at least one network parameter based on the assessment packets;

communicating a plurality of additional assessment packets to a remote endpoint;

selecting one of a plurality of codecs using the at least one network parameter, wherein selecting one of the plurality of codecs comprises negotiating with the remote endpoint to select a codec; and communicating media using the selected codec.

* * * * *